(12) United States Patent
Belschner et al.

(10) Patent No.: US 7,057,306 B2
(45) Date of Patent: Jun. 6, 2006

(54) FUEL CELL AND CONTROL UNIT IN A DETACHABLE HOUSING

(75) Inventors: Werner Belschner, Notzingen (DE); Reinhold Blutbacher, Schlierbach (DE); Anton Sonntag, Kirchheim (DE); Josef Sonntag, Kirchheim (DE)

(73) Assignee: NuCellSys GmbH, Kirchheim-Nabern (DE)

( * ) Notice: Subject to any disclaimer, the term of this patent is extended or adjusted under 35 U.S.C. 154(b) by 532 days.

(21) Appl. No.: 10/203,934

(22) PCT Filed: Jan. 27, 2001

(86) PCT No.: PCT/EP01/00879

§ 371 (c)(1),
(2), (4) Date: Nov. 25, 2002

(87) PCT Pub. No.: WO01/60655

PCT Pub. Date: Aug. 23, 2001

(65) Prior Publication Data

US 2003/0137193 A1    Jul. 24, 2003

(30) Foreign Application Priority Data

Feb. 18, 2002 (DE) .............................. 100 06 781

(51) Int. Cl.
*B60L 1/00* (2006.01)
(52) U.S. Cl. ..................... 307/9.1; 361/626
(58) Field of Classification Search ............ 307/9.1; 335/202; 361/626
See application file for complete search history.

(56) References Cited

U.S. PATENT DOCUMENTS

| 5,053,634 | A | | 10/1991 | Kakinuma | 307/9.1 |
|---|---|---|---|---|---|
| 5,132,865 | A | * | 7/1992 | Mertz et al. | 361/6 |
| 5,510,658 | A | * | 4/1996 | Nakayama | 307/10.1 |
| 6,158,537 | A | * | 12/2000 | Nonobe | 180/65.3 |
| 6,184,762 | B1 | * | 2/2001 | Reiss et al. | 335/202 |
| 6,777,909 | B1 | * | 8/2004 | Aberle et al. | 320/104 |

FOREIGN PATENT DOCUMENTS

| DE | 33 21 421 A1 | 6/1983 |
|---|---|---|
| DE | 198 27 880 C1 | 6/1998 |
| DE | 198 29 777 A1 | 7/1998 |
| DE | 199 50 008 A1 | 10/1999 |
| DE | 199 54 306 A1 | 11/1999 |
| EP | 0 633 158 A1 | 6/1994 |
| WO | WO 99/46140 | 9/1999 |
| WO | WO 200127955 A1 * | 4/2001 |

OTHER PUBLICATIONS

German Search Report and translation of relevant portions thereof.
PCT International Search Report and translation of relevant portions thereof.

* cited by examiner

*Primary Examiner*—Brian Sircus
*Assistant Examiner*—Brett Squires
(74) *Attorney, Agent, or Firm*—Crowell & Moring LLP (57) ABSTRACT

The invention relates to a vehicle with a fuel cell for producing power. The vehicle has a monitoring and switching unit which is enclosed in a housing that is detachably connected to the fuel cell housing.

29 Claims, 4 Drawing Sheets

FUEL CELL AND CONTROL UNIT IN A DETACHABLE HOUSING

BACKGROUND AND SUMMARY OF THE INVENTION

This application claims the priority of German priority document 100 06 781.6, filed 18 Feb. 2000 (18.02.2000) (PCT International Application No. PCT/EP01/00879), the disclosure of which is expressly incorporated by reference herein.

The invention relates to a fuel cell apparatus for producing electrical power that is distributed to electrical loads in a high voltage line network, and to further electrical loads in a low-voltage line network that is connected to the high-voltage line network via at least one DC/DC converter. In addition to the loads, the low voltage network contains at least one rechargeable battery.

Mobile devices, such as vehicles with a fuel cell for producing electrical power, often have two electrical line networks. A high-voltage network, which is fed from the fuel cell, contains the relatively high-power loads, such as one or more traction motors and loads which are required for operating the vehicle when at rest or when in motion, as well as electrical drives for auxiliary equipment for starting and for operating the fuel cell (for example, a PEM fuel cell). The second network is a low-voltage network with relatively low-power electrical loads that are switched on as required during motion or when the mobile device is at rest. The low-voltage network is also connected to drives and other loads, such as heating circuits or a battery, which are required for starting the fuel cell.

The low-voltage network contains a rechargeable battery which supplies electrical power to the appropriate loads for starting the fuel cell. Bidirectional DC/DC conversion is provided between the two networks and, during operation, supplies charging current from the fuel cell for the rechargeable battery and, when required, operating current for loads that are connected in the low-voltage network. While one pole of the low-voltage network is connected to the mobile apparatus ground, the high-voltage network is electrically isolated.

One object of the invention to provide a compact appliance which can be handled on its own and can be installed in an apparatus such that it can be replaced.

Another object of the invention is to provide such a system that carries out monitoring functions for electrical variables, distribution functions for the loads and disconnection functions in order to prevent damage in the event of critical operating states.

Still another object of the invention is to provide an arrangement for switching functions during the phases in which the fuel cell is being started and switched off, for the fuel cell, for the loads and for the line network, in the apparatus which contains a fuel cell for producing power and contains at least one network with electrical loads that are supplied with power from the fuel cell.

These and other objects and advantages are achieved by the apparatus according to the invention, which has at least one fuel cell for producing electrical power that is distributed to electrical loads in a high-voltage power network connected to the fuel cell, and to further electrical loads in a low-voltage power network that is connected to the high-voltage power network via at least one DC/DC converter, and contains at least one rechargeable battery. A separable central monitoring and switching unit has a housing that can be detachably connected to the fuel cell housing. Conductors connected to an electrical outputs or poles of the fuel cell are arranged via dust-tight and water-tight bushings in the wall of the housing and detachable contact means. At least one such conductor includes a contact of a fuel cell circuit breaker in the course of the line. Branches run from the conductors, which are provided with fuses in at least one pole, to dust-tight and water-tight bushings in a housing wall with detachable contact means connected to lines from loads that are supplied with power from the fuel cell. One branch from the low-voltage line network runs via a dust and water-tight bushing to a control and evaluation unit which is associated with the central monitoring and switching unit and is connected to sensors for detecting the operating states of the fuel cell and of the electrical line networks. Such branch also runs via dust and water-tight bushings and easily detachable contact means in or on a housing wall, to sensors which detect operating states of the mobile apparatus. The control and monitoring unit closes the fuel cell circuit breaker once the fuel cell has been started and has reached its operational readiness. Upon detection by the sensors of the occurrence of certain predetermined critical operating states, for which the supply of power to the high-voltage line network must be connected or disconnected, the control and monitoring unit opens the fuel cell circuit breaker.

The functions which are essential for controlling and monitoring the electrical line networks and their loads are carried out by components in an appliance which can be extended and can be checked separately. Fast functional testing and fault localization are thus possible. The appliance can be manufactured at low cost as a separable unit and can be installed in the mobile device quickly and easily, with bushings preventing the ingress of moisture. Operation of the appliance is thus not adversely affected, even when located in a moist atmosphere. A suitable control and evaluation unit is known, such as for example as disclosed in German Patent Application 199 500 08.8. Reference is hereby made to this patent application from the same applicant.

The control and evaluation unit can be arranged in the interior of the housing, together with the other components of the central monitoring and switching unit, and can be handled as a component of the central monitoring and switching unit. The other components of the monitoring and switching unit form a switching and distribution unit. In a preferred embodiment, the control and evaluation unit is arranged in its own housing, which has the bushing for the branch for the low-voltage network and the bushings for the easily detachable contact means in or on the housing wall for the line connections for the sensors for detecting the operating states.

In one of the housing walls, plug connectors are arranged with connections for lines that connect the control and evaluation unit to the sensors for detecting the operating states of the fuel cell and of the electrical line networks. In this case, the dedicated housing can be detachably mounted, as a cover for an opening on the housing which can be attached to the fuel cell housing. In this embodiment, the control and evaluation unit forms a separate unit, and can be installed and disconnected even without disconnecting the central monitoring and switching unit. That is, this unit can also be produced, tested, stored and transported, which is advantageous, at least with regard to spares stockholdings.

It is particularly advantageous for the housing of the control and evaluation unit to be thermally insulated from the housing with the components of the switching and distribution unit. The control and evaluation unit may therefore contain electronic components whose operating temperature is not significantly adversely influenced by the operating temperature of the fuel cell. For example, large-scale integrated electronic circuits such as processors may be provided in the control and evaluation unit.

In one especially advantageous embodiment, the control and evaluation unit has a printed circuit board which is provided with electronic components and is arranged in the interior of a trough-shaped cover that covers the housing (which is open on one side), with the components of the switching and distribution unit. A thermally insulating insert is provided in front of the opening in the housing. In this embodiment, when the housing is open, both the interior of that part of the monitoring and switching unit which has the power distribution, fuse and switching elements (that is, the switching and distribution unit) and the control and evaluation unit in the cover are easily accessible, considerably simplifying the fuel cell system and facilitating testing, inspection and maintenance.

The apparatus is preferably designed to be mobile. In particular, the apparatus is a motor vehicle which is supplied with power from a fuel cell. However, it may also be any other mobile apparatus, such as a boat, ship, locomotive, prime mover or the like.

The water-tight bushings and the easily detachable contact means are preferably in the form of water-tight plug connectors. The plug connectors are secured in particular by means of "interlock" connections against being mated and disconnected while on load. These plug connectors allow not only quick connection and disconnection of the contacts, but also protect against the ingress of dust, water or moisture into the housing interior.

One other option is to provide water-tight line bushings which, at least at their ends outside the housing, have cable lugs for attachment to the associated ends of the line networks.

In one preferred embodiment, the control and evaluation unit is connected to gas sensors arranged outside the housing, for the detection of leaks in units which produce hydrogen, store hydrogen or carry hydrogen, to a sensor, which is arranged in the housing with the power distribution, fuse and switching elements, for the fuel cell current. It is also connected to at least one sensor arranged outside the monitoring and switching unit, for detecting an impact between the mobile device and an obstruction; to an arrangement situated in the housing with the power distribution, fuse and switching elements, for measuring the insulation resistance of the electrically insulated line network; and to a sensor which is arranged inside the monitoring and switching unit, for the fuel cell voltage, and opens the fuel cell circuit breaker upon detection of a measured value that is undesirable or unacceptable for safety reasons. The control and evaluation means, which are provided for operational safety and reliability of the fuel cell system and of the line network, are protected in housings, in this embodiment. When such a measured value such is detected, the control and evaluation unit opens the fuel cell circuit breaker to interrupt the power output from the fuel cell, such that the line network together with the electrical loads is changed to a safe operating state. This avoids any danger to personnel, parts of the apparatus itself, as well as the entire apparatus with the fuel cell system and the environment. In one particularly expedient embodiment with a monitoring and switching unit to which a control and evaluation unit having a housing in the form of a cover is connected, plug connectors which disconnect the lines to the loads when the cover is disconnected are arranged on the cover edges. In this case the housing, which is in the form of a cover, can be connected by means of plug connectors to the lines to the loads. When the cover is removed, the voltage is disconnected from the lines to the loads, provided that the loads do not include an energy store, such as a battery or a capacitor.

The control and evaluation unit monitors, in particular, the fuel cell output current for overshooting a predeterminable limit value. It can also monitor the current of the electrical drive and the voltages of the fuel cell and possibly monitors the low-voltage network for overshooting or undershooting predeterminable limit values and monitors the insulation resistance for undershooting a predeterminable value.

It is expedient for the housing to be arranged at a point in the mobile device such that mechanical destruction of the mobile device has little or no effect on it.

The control and evaluation unit preferably comprises integrated circuits arranged on a printed circuit board in the housing. The conductors and branches in the housing interior may be in the form of a cable harness, conductors using stamped grid technology, conductor tracks on a printed circuit board (for example, a multilayer printed circuit board), copper rails, or flexible circuit technology. The nature of the conductors and branches depends on the magnitudes of the currents which are being distributed. Two or more of the techniques mentioned above may also be used in the housing.

In one preferred embodiment, the fuel cell can be switched off, in particular by detachable contacts, via a line which can be disconnected from the connection to the fuel cell housing when the housing is removed. This embodiment is a safety circuit. The safety circuit can be formed by a link via two plug contacts, or may be in the form of a separately routed line to the high-voltage supply.

It is particularly expedient for the housing of the monitoring and switching unit and/or the fuel cell housing to have centering or guide means for interlocking attachment of the housing to the fuel cell housing. The housing can thus be fitted to the fuel cell quickly and easily, in the position in which it is held.

The housing of the monitoring and switching unit can be screwed to the fuel cell housing, or can be attached by latching means. The mechanical attachment of the housing to the fuel cell housing is physically simple, and can thus be produced or detached easily.

Direct attachment of the housing of the monitoring and switching unit to the fuel cell housing results in short line sections between the electrical outputs of the fuel cell and the fuel cell circuit breaker, which is in the form of a power switch. The joining direction of the housing may be chosen to match the available space on the fuel cell, at an easily accessible point. The housing of the central monitoring and switching unit can be attached to the fuel cell housing in a particularly rigid manner. There is no need for it to be held in a particular manner on other parts of the mobile device. The coupling of the housing to the fuel cell housing means that the retention of the fuel cell housing in the mobile device is sufficient for both housings, so that the housing of the monitoring and switching unit is coupled, in terms of vibration and oscillations, to the fuel cell.

The nature of the attachment and the location of the housing of the monitoring and switching unit allow the housing to be fitted and removed easily and quickly. Servicing and repair work can thus be carried out not only with the monitoring and switching unit installed but also with it removed. The monitoring and switching unit can be installed and removed without removal of other parts of the mobile unit.

It is expedient for a dedicated housing, or at least a compartment for fuses in the conductors and their branches, to be arranged within the housing of the monitoring and switching unit and to be accessible through a sealable opening in the housing of the monitoring and switching unit. With this construction, fuses can be replaced easily and quickly, without having to remove the housing. The fuse holders are, in particular, mounted on a printed circuit board. Depending on the size of the line cross sections of the lines running to the fuse holders, and on the number of fuses, it is also possible to use insulated lines, stamped grids composed of electrically highly conductive materials, conductor rails or flexible circuits with conductor tracks. The fuses for the high-voltage line network are preferably arranged in the fuse housing, and are accessible via an opening, which can be sealed, from outside the housing of the monitoring and switching unit. This opening can be sealed in particular by means of the cover-like housing of the control and evaluation unit. This allows the fuses for the high-voltage line network to be accommodated in a safe and sealed manner. The compartment with the fuses for the branches of the high-voltage network expediently has an additional cover in the housing of the central monitoring and switching unit. This provides safety against accidentally touching them after opening the housing of the monitoring and switching unit.

The fuses are expediently arranged on a printed circuit board under the cover, which can be sealed, of the housing of the central monitoring and switching unit.

The low and high-voltage line networks are DC networks, and have two poles. Since one pole of the low-voltage line network is connected to the mobile device ground, a single-pole fuse is sufficient for the network and load lines. The branches and loads in the high-voltage line network may have single-pole or two-pole protection.

The drive motor or motors for the propulsion system as well as the upstream converter and other electrical loads are protected, in particular, in the interior of the monitoring and switching unit.

If a particularly rugged housing is required for the monitoring and switching unit, it may be made from metal, which offers the additional advantage of good thermal conductivity, so that heat produced in the housing is efficiently dissipated. The amount of heat emitted to the exterior can be increased further by means of cooling ribs or heat exchangers in some other form.

A very strong housing can also be made from a high-strength resistant plastic, which also reduces its weight. A housing such as this is expediently composed partially of metal, if the heat is intended to be dissipated to the exterior via the highly thermally conductive metal. The housing section which is composed of metal has, in particular, cooling ribs.

In a further preferred embodiment, the housing of the monitoring and switching unit has a switch, for example a microswitch, or sensors on housing openings, which responds when the housing cover is opened, opening the fuel cell circuit breaker by interrupting its holding current. (The switch on the opening of the housing is arranged, for example, in the circuit of the coil for the fuel cell circuit breaker.) Once the fuel cell circuit breaker has opened, there is no voltage within the housing, except for low-voltage circuits and the line sections from the outputs of the fuel cell to the contacts of the fuel cell circuit breaker. Instead of a switch on the housing cover, it is also possible to use a sensor, for example a light barrier etc. If the control and evaluation unit is arranged in the cover for the housing of the monitoring and switching unit, then there is no current to the fuel cell circuit breaker when the cover is removed, so that the high-voltage line network is not live.

The fuses for the low-voltage line network circuits can likewise be arranged in the housing of the monitoring and switching unit. In this case, they are expediently arranged so that they are accessible from the outside and are separated from the fuses for the high-voltage line network. However, it is also possible to arrange the fuse for the low-voltage line network in an externally accessible housing, separate from the housing of the monitoring and switching unit. The fused switches are, for example, arranged on a printed circuit board. The fuse holders may also be connected to copper rails or to flexible lines or to flexible circuits with conductor tracks. An arrangement in which the connections for the fuse holders use stamped grid technology is likewise possible.

The fuse housing for the low-voltage line network is, by way of example, integrated in the low-voltage line network. However, a separate fuse housing is advantageous, which is externally accessible independently of the housing of the monitoring and switching unit.

The DC/DC converter device, which is arranged for example between the high and low-voltage line networks as a bidirectional converter, may require a precharging current in order to start to operate. The precharging components may be arranged in the housing of the monitoring and switching unit. If no precharging option is required, the space reserved for these components in the housing remains free. Another advantageous arrangement for the equipment of the monitoring and switching unit is for the components to be installed in their own housing, which can be fitted externally to the housing of the monitoring and switching unit, with water-tight bushings and plug connectors being provided for the electrical connection in the two housings.

The fuel cell circuit breaker for isolating the fuel cell from the loads and from a hybrid battery or supercapacitor may have two poles, with both poles being circuit breaker poles for interrupting short-circuits. However, it is also possible to design the contact for only one pole to switch full-load and short-circuit currents. The other contact is then only in the form of an isolating switch, which does not have to switch high currents. In this case, the second contact can be opened with a certain delay with respect to the first contact, since the first contact switches higher currents. One contact may then be a switch without contacts, for example a semiconductor switch. A single-pole fuel cell circuit breaker may also be used, which is designed for switching the maximum load current and the short-circuit current.

In order to simplify servicing and repair of components of the mobile device, without danger from live objects, it is expedient to provide a manually operable off switch in the housing of the monitoring and switching unit. In this case, the off switch can be operated from the outside without removing the housing, allowing the high-voltage line network, together with its electrical loads, to be conductively isolated from the fuel cell. It is expedient to provide an additional switch, which is externally accessible, for any hybrid battery or supercapacitor which may be used.

Other objects, advantages and novel features of the present invention will become apparent from the following detailed description of the invention when considered in conjunction with the accompanying drawings.

DETAILED DESCRIPTION OF THE INVENTION

Figure 1:
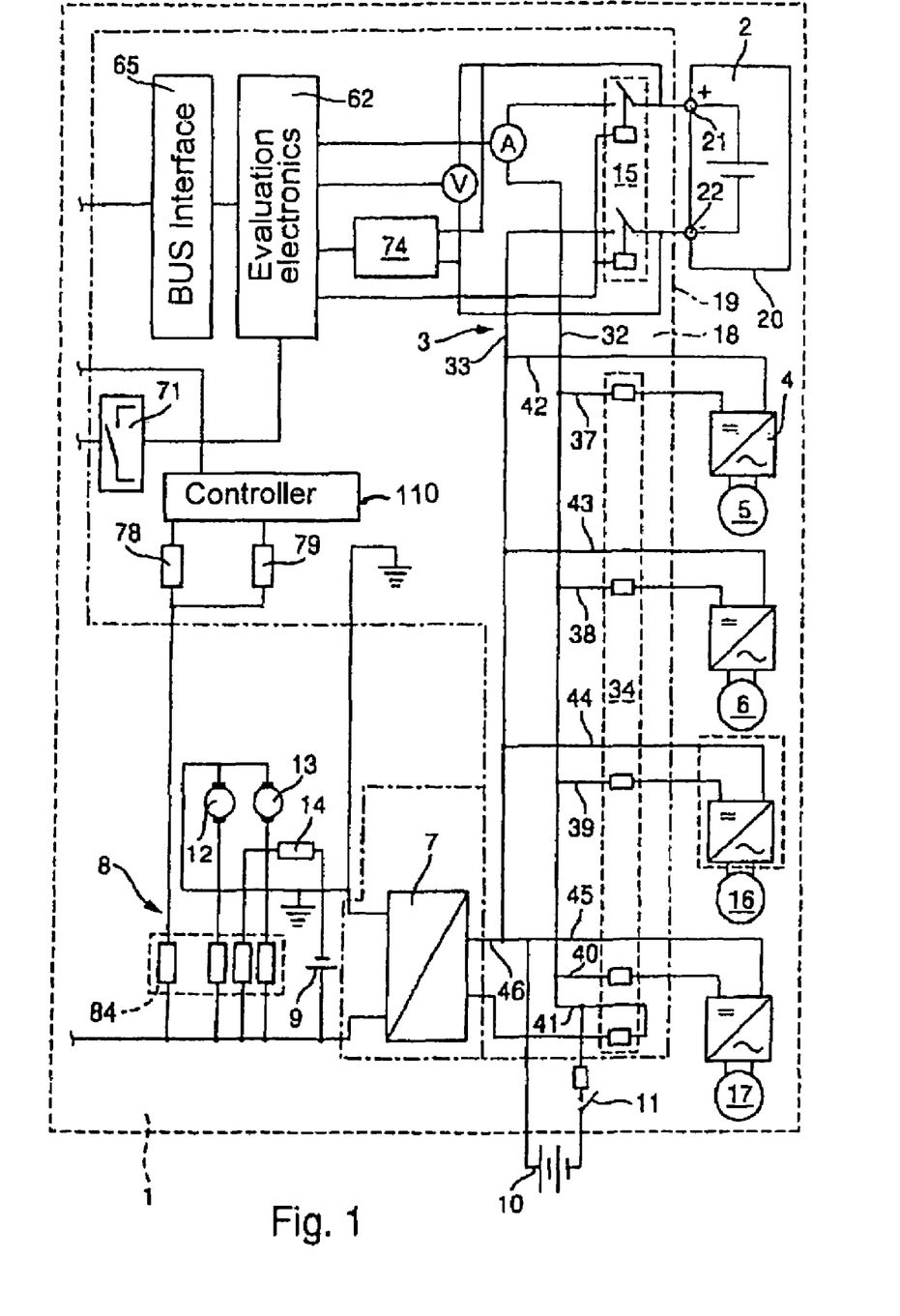
FIG. 1 is a schematic diagram of a fuel cell electric power distribution network according to the invention.

Referring to FIG. 1, a mobile device 1, in particular a vehicle, contains a fuel cell 2, such as a PEM cell having a stack of individual fuel cell modules. The fuel cell 2 feeds electrical loads 5,6,16,17 and at least one energy store 10 such as a hybrid battery or supercapacitor, via a two-pole line network 3. Since the fuel cell 2 is formed from a relatively large number of individual modules, a higher output voltage is emitted during normal operation.

The line network 3 is therefore referred to as a high-voltage line network or as a high-voltage network. The high-voltage network 3 is connected via a converter 4 to a drive motor 5 which, for example, drives the wheels of a vehicle, and via a converter (not identified in any further detail) to a drive motor 6 for a compressor that supplies air to the fuel cell 2. The network 3 is also connected to a bidirectional DC voltage interface, for example a bidirectional DC/DC converter 7, which has a further input/output to the vehicle power supply network 8, whose operating voltage is lower than that of the high-voltage network 3. The vehicle power supply network 8 (also referred to as a low-voltage network) is connected to a rechargeable battery 9, which can be connected, for example via switches, to the DC/DC converter 7. The low-voltage network 8, whose operating voltage is, for example, 12 or 14 V, has a number of electrical loads, of which only a windshield wiper motor 12, a fan motor 13 and a heater 14 are illustrated in FIG. 1. A further vehicle power supply network with a voltage of 36 V or a network at 24 V for a LAN or bus may also be provided.

The fuel cell 2 can be connected to the high-voltage line network 3 via, for example, a two-pole fuel cell circuit breaker 15. A fan motor 16 and a pump motor 17 are connected to the network 3, for example via converters (not identified in any more detail). Further loads (not shown) and a hybrid battery or supercapacitor 10, may also be connected to the high-voltage network 3. The supercapacitor 10 can be disconnected from the line network 3, in particular by means of an off switch 11.

Figure 2:
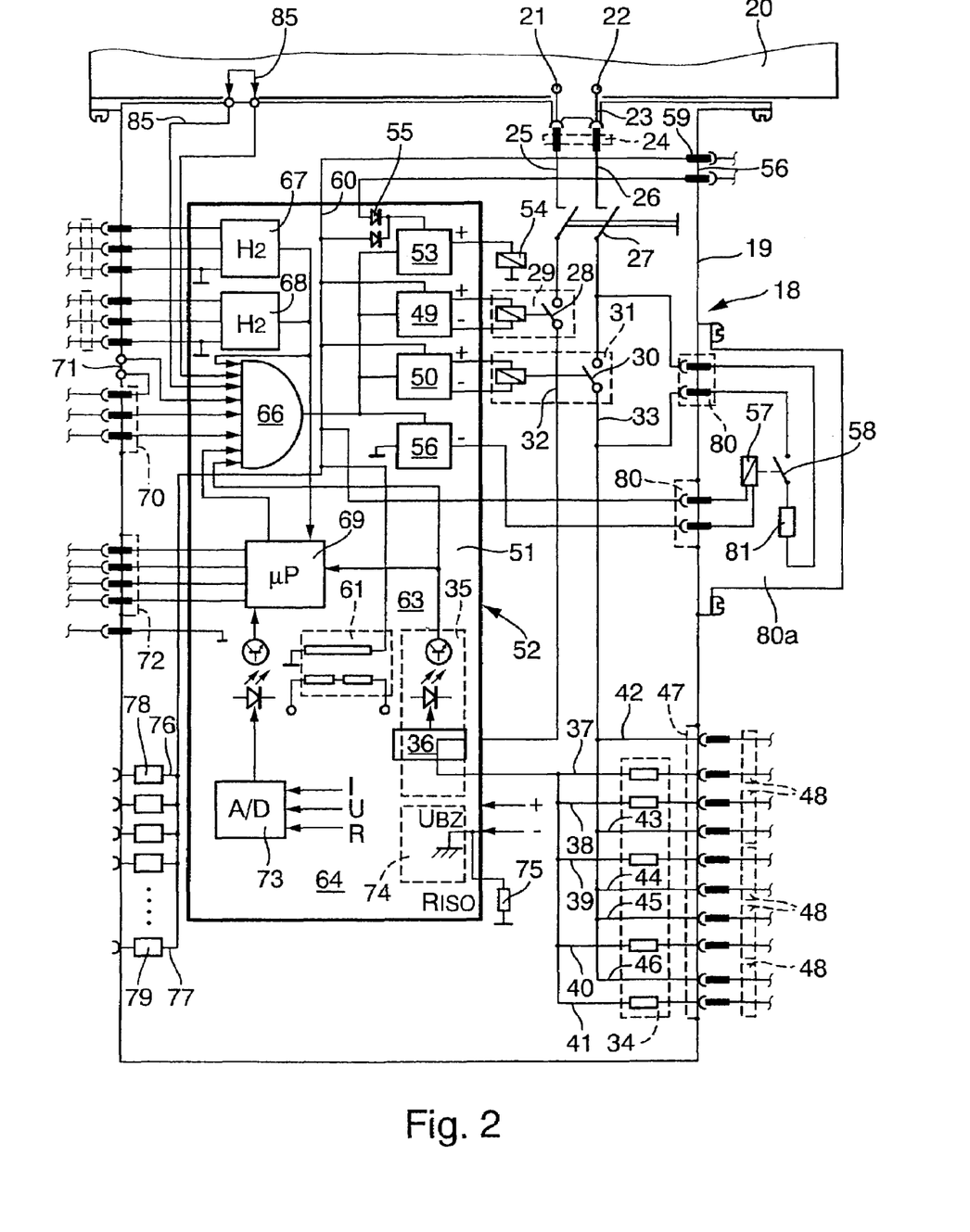
FIG. 2 is a block diagram of a central monitoring and switching unit, which is arranged in a mobile device and is detachably connected to the fuel cell.

The mobile apparatus 1 has a central monitoring and switching unit 18 which is shown in more detail in FIG. 2. It is located in a housing 19 that is detachably mounted on the housing 20 of the fuel cell 2. The fuel cell 2 has two electrical outputs (poles) 21, 22 which are connected to a water-tight plug connector 23. A corresponding plug connector part 24 is located on the housing 19, and its contacts, which are not identified in any more detail, are connected in a two-pole configuration via conductors 25, 26 to the contacts of an off switch 27, which can be operated by hand by means of a handle which projects out of the housing 19. When the off switch 27 is opened, the entire high-voltage network 3 located downstream from the off switch 27 is de-energized except, for example, for battery or capacitor subscribers which can be switched off separately so that servicing, maintenance or repair work can be carried out on or in the mobile device, without removing the housing 19 and without any danger from live parts.

Downstream from the off switch 27, the conductors 25, 26 each have a mate contact 28 of a first fuel cell circuit breaker 29, and a mate contact 30 of a second fuel cell circuit breaker 31. The mate contact 28 is followed by a conductor 32, and the mate contact 30 is followed by a conductor 33. The conductors 25, 36, 32 and 33 are components of the high-voltage network 3, which is electrically isolated. (That is, it is ungrounded.) Two single-pole fuel cell circuit breakers 29, 31 improve the disconnection safety in comparison to a two-pole fuel cell circuit breaker with poles which are operated jointly, since the probability that the two switches cannot be operated is less than the probability of failure of one switch. The off switch 27 may be omitted if precautions are taken to ensure that the fuel cell circuit breakers 29, 31 can be operated (disconnected) by hand.

A monitoring and switching unit 18 without a separate off-switch is shown in FIG. 1. A housing 34 with fuse holders and fuses, which will be described in more detail later is located in the interior of the housing 19. The conductor 32 is connected to a current sensor 35 (FIG. 2) which has a current transformer 36 with an annular core, through which a power conductor is passed, without making contact. Branches 37, 38, 39, 40, 41 originate from the conductor 32 downstream from the current transformer 36 while branches 42, 43, 44, 45, 46 originate in a corresponding manner from the conductor 33. The branches 37 to 41 run into the interior of the housing 34 to fuse holders having fuses, which are not identified in any more detail. Conductors run from the fuse holders of these fuses and from the branches 42 to 46 to a plug connector 47 in the wall of the housing 19. Pairs 37, 42 and 38, 43; 39, 44, 40, 45 and 41, 46 form branch lines to loads in the mobile device 1. The branch lines 37, 39, 40 and 41 are provided with fuses, which are not identified in any more detail and, together with the branch line 43 with the branches 42, 43, 44, 45, 46, are intended for the connection of external lines to the housing 18, which originate from the loads and have plug connectors 48 at the ends, which correspond to the plug connector 47. The plug connector 47 is designed to be water-tight, in the same way as the plug connector 24. The branch lines 37, 42 and 39, 44; 40, 45; 41, 46 are connected, for example, to the converter 4, and to the converters for the fan and pump motors 16, 17 and for the DC/DC converter 7. The branches 38, 43 are connected to the drive unit, which contains a separate protection device, by means of the converter and the drive or traction motor 6.

The branches which are illustrated in FIG. 2 are indicated only as an example, for illustrative purposes. There may also be more branches depending on the number of high-voltage loads in the mobile device.

The conductors 25, 26, 32, 33 and the branches 37 to 44 as well as the conductors which run from the fuse holders in the housing 34 to the plug connector 47 are insulated conductors produced using stamped grid technology, or copper rails. Printed conductor tracks on boards or flexible circuits may also be provided. The configuration of the conductors using one of the techniques which have been mentioned depends on the number of these conductors and on the conductor cross sections that are required.

The fuel cell circuit breakers 29, 31 are designed for disconnecting the full-load current and the short-circuit current. Tripping with only a single-pole fuel cell circuit breaker is also possible. Since the mate contacts 28, 30 must open when the fuel cell system or the vehicle is in a critical state, the provision of two contacts, which can be operated independently of one another, provides a higher level of confidence that one contact will operate in the event of a defect in the other, thus disconnecting at least one pole of the network.

The coils of the fuel cell circuit breakers 29, 31 and/or contactors or relays are each connected to outputs of a control module in the form of economizers 49 and 50, which are arranged on a printed circuit board 51 in a control and evaluation unit 52, (part of the central monitoring and switching unit 18, which will be explained in more detail later). The economizers 49,50 produce a higher power for operation, that is, for pulling in, of DC contactors or relays, and then emit a lower holding voltage for the circuit breakers 28, 31 or relays. A relay driver module 53 is also located on the printed circuit board 51, and is connected to a relay 54 which is not on the printed circuit board 51. The driver module 53 has two inputs, one of which is connected via a diode 55, which is arranged on the printed circuit board 51, to a plug connector 56, on the housing 19, to which a key-operated switch is connected, by means of which the vehicle is started. When the key-operated switch is closed, the voltage from the vehicle low-voltage network 8 is applied to one input of the driver module 53. This low-voltage network is the normal power supply network for vehicles and contains a rechargeable battery 9 with a voltage of, for example, 12 V, 14 V, 24 V or 36 V. Loads in this low-voltage network include, for example, windshield wiper motors, fan motors, window winder motors, lamps, indicator lights, etc. The relay 54, which is also referred to as the system relay, supplies, once it has operated, electronic components on the printed circuit board 51 via its contact with the operating voltage of, for example, 12–14 V, 24 V or 36 V.

There is also a further driver module 56 on the printed circuit board 51 which is fitted, in particular, with the components of the control and evaluation unit 52*l*. This further driver module 56 has two inputs, with a relay 57, which is not located on the printed circuit board 51 and is outside the housing 19, being connected to its output. One conductor track 60 on the printed circuit board 51 is connected via a plug connector 59 in the housing 19 to the low-voltage network 8, which is connected to the housing 19 via a plug connector (not identified in any more detail). A number of components on the printed circuit board 51 are connected to the conductor track 60, including the connections for the operating power supply for the economizers 49, 50. The connection for the operating power supply for the driver stage 53 is also connected to the conductor track 60 via a diode, which is not identified in any more detail. Furthermore, one connection of a power supply unit 61 is connected to the conductor track 60. The second connection of the power supply unit 61 is connected to vehicle ground. The power supply unit 61 is in the form of a DC/DC converter and has no conductive connection (as indicated in the drawing by the transformer symbol) between the input voltage and the output voltage. The power supply unit 61 uses the operating voltage of, for example, 12 or 14 V from the vehicle power supply network to produce a higher voltage of, for example, 15 V. The relay 57 controls precharging of the DC voltage/DC voltage interface, and has a contact 58 which is connected in parallel with one of the mate contacts 28 or 30, in series with a resistor. The coil of the relay 57 is connected via a plug connector 80 to the driver module 56 and to the conductor track 60. The series-connected contact 58 and resistor 81 are connected by means of plug connectors to lines in the housing, which form a circuit in parallel with the mate contact 30.

The printed circuit board 51 is subdivided into two sections 63, 64 in terms of the operating voltage and the voltage levels of the components arranged on it, thus physically isolating the components at the different voltage levels. This provides a high level of safety with regard to short-circuits between components and lines, or conductor tracks at different voltage levels.

Evaluation electronics 62 and a bus interface 65 (FIG. 1) are located on the section 63 which is associated with the low voltage level. The evaluation electronics include a logic circuit 66, which has a number of inputs, and whose connection to components will be described in more detail latter. On its output side, the logic circuit 66 is connected to control inputs of the economizers 49, 50 and of the driver modules 53, 56.

The fuel cell system has gas sensors for hydrogen, in order to monitor the fuel. These gas sensors require operating voltages which differ from the voltage in the low-voltage network 8. In general, the operating voltage is less than the vehicle power supply network voltage. The signals which are produced by the gas sensors are at least not at the same voltage level as the vehicle power supply network or in the region of the input signals which can be processed by the logic circuit 63. Analog converter and matching circuits 67, 68 are thus provided on the printed circuit board 51. The converter and matching circuits 67, 68 each have outputs, which are not identified in any more detail, to which the operating voltage connections of gas sensors (not shown) are connected via plug connectors, which are not identified in any more detail, in the housing 19. Each converter and output circuits 67, 68 also has two inputs, which are not identified in any more detail but are connected to plug connectors in the housing 19, for the analog signals which are emitted from the gas sensors.

The outputs of the converter and output circuits 67, 68 are connected to one input of the logic circuit 66 and one input of a processor 69, which is preferably a microprocessor. This input of the processor 69 may be an analog input with a downstream A/D converter. One input of the logic circuit 66 is designed for threshold value detection. That is, the output signals from the converter and matching circuits 67, 68 are processed further by the logic circuit 66 only if they are beyond a certain level.

The converter and matching circuits 67, 68, the logic circuit 66 and the processor 69 are arranged with their appropriate connections on the printed circuit board 51 for external components and for conductor tracks between the connections and the inputs of these components in the section 63. The logic circuit 66 has further inputs, which are connected to plug connectors 70 of the housing 19. Switching contacts, for example, are connected to these inputs. These switching contacts are used, for example, to monitor whether devices in or on the vehicle are closed. One switching contact 71, which is supplied with voltage from the vehicle power supply network 8, is provided for monitoring a cover of the housing 19. Further inputs of the logic circuit 66 are connected via the plug connector 70 in particular to sensors for AIRBAGS and other sensors which detect and signal collisions of the mobile device or of the vehicle. A further input, which is not identified in any more detail, of the logic circuit 66 is connected to an emergency off switch via the plug connector 70. At least one input of the logic circuit 66 is connected to a corresponding output of the processor 69.

The processor 69 has inputs (are not identified in any greater detail) that are connected via a plug connector 72 on the housing 19 to a bus, to which other subscribers in the vehicle are also connected. The bus is preferably the CAN bus which is known per se. A serial interface of the processor 69 can be connected to appropriate transmission appliances. Furthermore, the processor 69 has a BOOT input, which is not identified in any more detail. The reference potential for those components which are arranged on the section 63 is the vehicle ground potential.

The current transformer 36 mounted on the section 64 is part of the current sensor 35, which measures the fuel cell current using the known compensation principle. The current sensor 35 is connected, for example, via a multiplexer (not shown) to an A/D converter 73, which in turn is connected by means of an optocoupler to the processor 69. Furthermore, at the output, the current sensor 35 has an optocoupler (not identified in any more detail) whose output is connected to one input of the processor 69, and to one input of the logic circuit 66. The A/D converter 73 is connected to one input, for example, via the multiplexer, and a line which is not illustrated is connected to the positive output 21 or to the negative output 22.

A device 74 for measuring the isolation resistance between the electrically isolated network and the mobile device or vehicle ground is located in the section 64. (The isolation resistance 75 is represented by dashed lines in the drawing.) The reference potential for those components which are arranged in the section 64 is the potential of the positive or negative output 21, 22 of the fuel cell 2. The isolation resistance 75 is measured using a known pulsed method.

During the isolation measurement, the processor 69 receives a number of measured values of the voltage across the measurement resistor, only after a specific waiting time, which is matched to the transient time of the measurement system, averages these measured values in order to minimize low-frequency interference, and then calculates the isolation resistance. During operation of the mobile device or of the vehicle, when the voltage at the output of the power supply unit 61 is available, the isolation resistance of the ungrounded network of the fuel cell 2 is measured continuously. In the event of unacceptable deteriorations in the isolation, the processor 69 causes the switching contacts 28, 30 of the switches 29, 31 to open, via the logic circuit 66.

The current transformer 36 has an additional winding, into which a defined current is fed from a current source, in order to check the serviceability of the current transformer and the optocoupler, including the serviceability of the conductor tracks as far as the processor 69.

The logic circuit 66 has hardware logic functions of a combinational and sequential nature, and possibly memory functions, thus ensuring that the input signals are processed quickly. This means that, in critical situations in and on the mobile device or on the vehicle, or in the event of dangers to the vehicle occupants, which are signaled by appropriate sensors, the logic circuit 66 very quickly processes and passes on the appropriate messages, causing the switching contacts 28, 30 and 58, respectively, to open, via the economizers 49, 50 and 56, respectively. Voltage is thus removed from the high-voltage network 3 together with the loads which are connected to it, so that it is no longer possible for any danger to originate from a dangerous voltage.

The detection of a short-circuit current in the fuel cell network is reported to the processor 69 and, via the logic circuit 66, results in immediate tripping, (opening) of the switching contacts 28, 30 and of the contact, if this is in the closed state.

The monitoring measures described above and the separation of the printed circuit board 51 into a low-voltage section 63 and a high-voltage section 64 achieve a high level of safety on their own. The device 74 for measurement of the isolation resistance is controlled or actuated from the processor 69 via an optocoupler interface, which is not shown in any more detail. This also applies to the A/D converter 73 and to the current sensor 35.

All the inputs and outputs of the components on the section 63 are resistant to short-circuits to the vehicle ground and to the 12 V, 14 V or 24/26 V voltage and, in the event of a short-circuit, can be detected as faults which are signaled and (in addition to signaling in the case of short-circuits which have an unacceptable adverse effect on the safety of operation and of the vehicle) cause the switching contacts 28, 30 to be opened. The relay 57 with the contact 58 and the resistor 81 as well as the associated conductor tracks and plug connectors are located in a dedicated housing 80*a*, which can be detachably mounted on the housing 19, and may be connected to the housing 19 when precharging of circuits and converters or transformers is required.

The low-voltage network 8 has branches of which only two are identified by 76, 77, in the housing 19. The branches, which have protective devices 78, 79 so that they are resistant to short-circuits, are connected via plug connectors (not identified in any more detail) to a controller 110 in the mobile device 1. The short-circuit-resistant branches form the interface from 12–14 V to the controller 110.

All the plug connectors on the housing 19 comply at least with Ingress Protection Class IP 67 in accordance with DIN 40050; that is, they protect against direct contact with live parts, against the ingress of dust and against the ingress of water. Those components which are required for monitoring of the electrical variables relating to the fuel cell and to the line networks 3 and 8 are located on the printed circuit board 52.

Water-tight cable bushings may also be provided, instead of the plug contacts described above. However, plug contacts have the advantage that the lines can be withdrawn easily, so that the monitoring and switching unit 16 can be removed more quickly. The components of the monitoring and switching unit 19 are designed in accordance with the motor vehicle standard.

The housing 19 is attached to the fuel cell housing 20 by means of two centering strips (not identified in any more detail) and screws 82, two of which are illustrated in FIG. 2.

When the housing 19 is inserted into centering strips on the housing 20, the plug connectors 23, 24 are mated. The rigid connection between the two housings 19, 20 results in the central monitoring and control unit 18 forming a unit which oscillates with the fuel cell 2, so that there is no need for any dedicated mounting, that is capable of oscillation, in the mobile device 1 or in the vehicle.

The conductors 32, 33 and 37 to 44 are preferably arranged with the fuse holders on a central distribution printed circuit board in the housing 19. The fuse holders together with the fuses are arranged under the cover 83 of the housing 19. (See FIG. 3.) There is also a cover on the fuses so that, when the cover is opened, the fuses and fuse holders cannot be touched until the additional cover is removed. The housing 19 may be fitted in the vehicle 1 such that it can be opened from underneath.

The housing 19 may be composed of metal or of a resistant plastic, or of a combination of both. The low-voltage line network 8 may have a fuse board 84 (indicated by dashed lines in FIG. 1), in the housing 19 or at some other point in the device 1. The arrangement in the housing 19 has the advantage that all the fuses are located at a central point. The lines to the fuses for the low-voltage network 8 can be connected by means of plug connectors (not shown). A line 85 which loops via the fuel cell housing 20 and is passed via plug connectors between the housings 19, 20 is opened when the housing 19 is removed. This line 85 is connected to the logic circuit 66, which opens the fuel cell circuit breakers 29, 30 when the line 85 is opened.

Plug connectors, for example 47, are arranged in the wall in the lower part of the housing 19. The plug connectors are connected to the wall in a dust-tight and water-tight manner. The cover 83 also covers the side walls of the housing and has openings in the region of the plug connectors.

Figure 4:
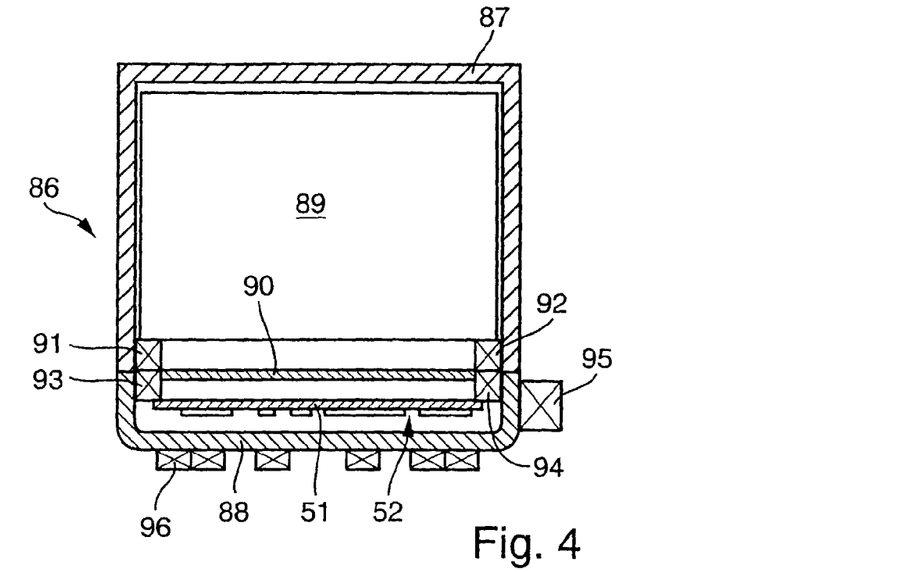
FIG. 4 is a schematic sectional view of the central monitoring and switching unit with another housing embodiment.

FIG. 4 shows a central monitoring and switching unit 86, which has a housing 87 for power distribution, switching elements and fuses in the high-voltage line network 3 and a housing 88 which encloses the control and evaluation unit 52 that forms a part of the monitoring and switching unit 86. Identical parts in FIGS. 1–5 are provided with the same reference symbols. The switching elements, conductor tracks, branches, and fuses on the high-voltage side of the monitoring and switching unit 86 (that is, the switching and distribution unit) are identified in general by 89 in FIG. 4. One face of the housing 87, which is in the form of a box, has an opening which extends entirely, or essentially entirely, over that face (not identified in any more detail). This opening can be closed off by the housing 88, which is in the form of a trough, with a U-shaped cross section. The depth of the housing 88 is intended to accommodate components of the control and evaluation unit 52, whose printed circuit board 52 is arranged in the housing interior, parallel to the flat board face of the housing 88, which forms a cover for the housing 87. The opening in the housing 89 is also covered by a thermally insulating panel 90. Plug connectors 91, 92 and 93, 94, respectively, are located at the edges of the housings 87 and 88. When the housings 87, 88 are connected to one another, the plug connectors 91 and 93 engage in one another in the same way as the plug connectors 92 and 94. The connections between the electrical components of the control and evaluation unit 51 and the electrical components of the switching and distribution unit, which is located in that part of the monitoring and switching unit 86 which is identified as 89, run via the plug connectors 91, 93.

Figure 3:
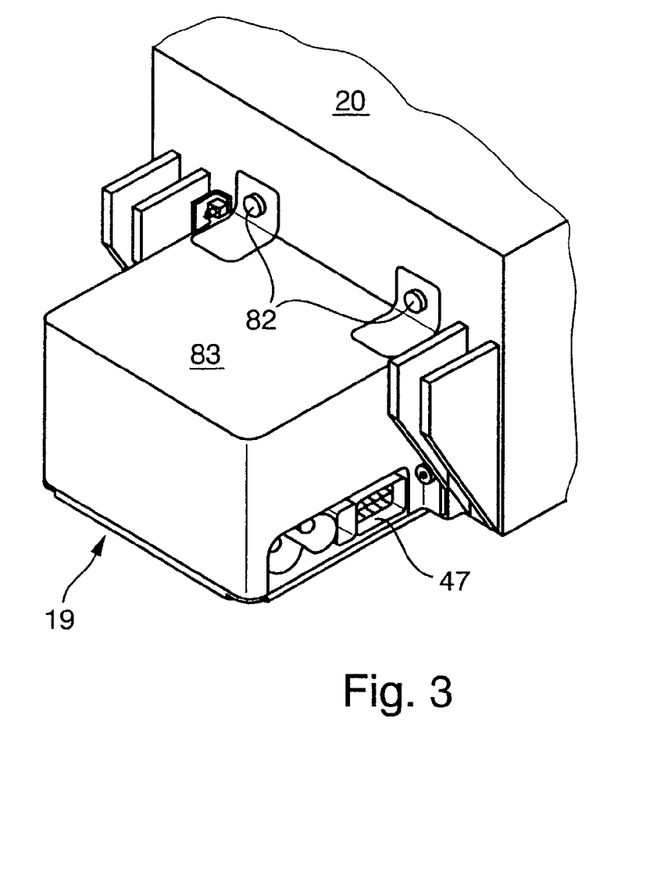
FIG. 3 is a perspective view of a central monitoring and switching unit whose housing is attached to the housing of the fuel cell.

The connections between the branches of the high-voltage line network 3 and the loads as well as the hybrid battery and/or the supercapacitor are passed via the plug connectors 92, 94. These branch lines run within the housing 88 to plug connectors 95 on one side housing wall. Lines which are not illustrated in any more detail but are equipped with appropriate plug connectors at the ends run from the plug connectors 95 to the loads and to the hybrid battery. Further plug connectors 96 on the housing 88 are provided for connection of lines which connect the sensors described above in the mobile device to the components of the switching and monitoring unit 52. When the housing 87 is opened by removing the housing 88, which is in the form of a cover, the electrical connections for the loads and for the hybrid battery are interrupted, so that the loads are not live. There is then no longer any need to operate a special off switch. Furthermore, the control lines between the switching and monitoring unit 52 and the battery circuit breakers are interrupted, so that the contacts of the battery circuit breakers are opened due to the lack of the coil voltage. Both the interior of the housing 87 and the housing 88 are then accessible, and there is no need for a dedicated cover monitoring switch. The housing 87 is connected to the fuel cell housing in a manner as illustrated in FIG. 3.

Figure 5:
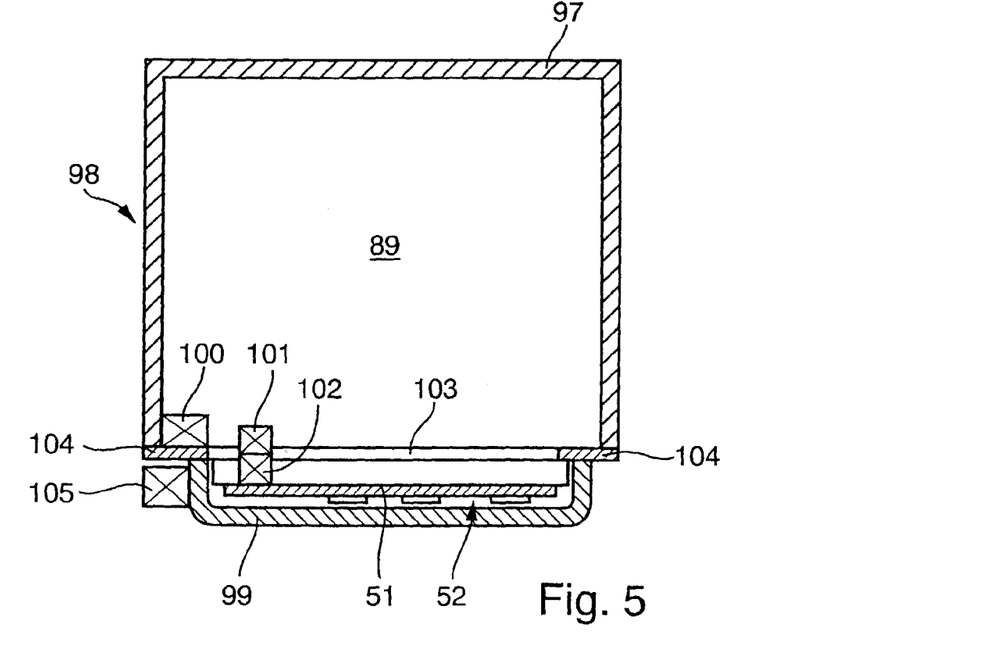
FIG. 5 is a schematic sectional view of the central monitoring and switching unit with a further housing embodiment.

FIG. 5 shows a form of a housing 97, which is somewhat modified from the apparatus shown in FIG. 4 in terms of the connections, with the components of the switching and distribution unit of a switching and monitoring unit 98 and of a housing 99 for the control and evaluation unit 51, whose printed circuit board 52 is arranged within the housing 99. The trough-shaped housing 99 forms the cover for the housing 97 which is open on one side, since, at the lower edge, it contains plug connectors 100 for connection of the branches to lines which run to the loads and/or to the hybrid battery or the supercapacitor.

A heat-insulating panel 103 separates the interior of the housing 97 from the interior of the housing 99. Seals 104 are provided between the edges of the openings of the housings 97 and 99. On one face, which is set back with respect to the side wall of the housing 97 located above it, the housing 99 has plug connectors 105 for the lines to sensors and/or signaling and indication elements, or to other bus subscribers in the mobile device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Apparatus having a fuel cell for producing electrical power that is distributed to electrical loads in a high-voltage line network connected to the fuel cell, and to further electrical loads in a low-voltage line network that is connected to the high-voltage line network via a DC/DC converter, said apparatus further comprising:

a central monitoring and switching unit having a first housing which can be mounted detachably on a fuel cell housing of the fuel cell;

electrical conductors which are arranged in said first housing and are connected to respective electrical outputs of the fuel cell via contact means and bushings in a wall of said first housing; wherein, at least one of said conductors includes a fuel cell circuit breaker;

said conductors are connected to loads via branches which are provided with fuses in at least one pole, and via bushings in a wall of said first housing and contact means;

the low-voltage line network is connected via a bushing to a control and evaluation unit which is associated with the central monitoring and switching unit;

the control and evaluation unit is connected via bushings in a wall of said first housing and contact means to sensors for detecting operating states of the apparatus;

the bushings in a wall of said first housing are dust-tight and water-tight; and the contact means are detachable.

2. The apparatus according to claim 1, wherein:

the control and evaluation unit closes the fuel cell circuit breaker when the fuel cell reaches operational readiness; and the control and evaluation unit opens the fuel cell circuit breaker upon detection of operating states, measured by said sensors, which correspond to predetermined critical operating states.

3. The apparatus according to claim 1, wherein the control and evaluation unit is arranged in an interior of the first housing, together with the other components of the central monitoring and switching unit.

4. The apparatus according to claim 1, wherein the control and evaluation unit is arranged in a second housing, which is fitted as a cover for an opening in a third housing which encloses a switching and distribution unit for the central monitoring and switching unit.

5. The apparatus according to claim 4, wherein the second housing is thermally insulated from the third housing with the components of the switching and distribution unit for the central monitoring and switching unit.

6. The apparatus according to claim 4, wherein:
the control and evaluation unit has a printed circuit board that is fitted with electronic components and is arranged in an interior of the second housing; and
the second housing is in the form of a trough-shaped cover and has an opening facing the opening of the third housing.

7. The apparatus according to claim 1, wherein the apparatus comprises a motor vehicle.

8. The apparatus according to claim 1, wherein the dust-tight and water-tight bushings and the easily detachable contact means are plug connectors.

9. The apparatus according to claim 1, wherein:
the control and evaluation unit is connected to
gas sensors arranged outside the housing for detecting leaks in units of the mobile device that produce hydrogen, store hydrogen or carry hydrogen;
a sensor for detecting fuel cell current;
at least one sensor for detecting an impact between the mobile apparatus and an obstruction;
a sensor for measuring insulation resistance of the high-voltage line network;
a sensor for detecting fuel cell voltage; and
a sensor for measurement of the voltage of the low-voltage line network; and
the control and evaluation unit opens the fuel cell circuit breaker when a measured value is detected by any of said sensors that is undesirable or unacceptable for safety reasons.

10. The apparatus according to claim 9, wherein the control and evaluation unit monitors:
the voltages of the high-voltage network and of the low-voltage network to detect values which exceed predeterminable limits;
the fuel cell output current for overshooting a predeterminable limit; and
the insulation resistance of the high-voltage network for undershooting a predeterminable limit.

11. The apparatus according to claim 1, wherein the first housing is arranged at a point which is substantially unaffected by mechanical destruction of the mobile device.

12. The apparatus according to claim 1, wherein the control and evaluation unit comprises integrated circuits which are arranged on a printed circuit board in the first and second housings.

13. The apparatus according to claim 1, wherein the fuel cell is disconnected from the supply networks via a line which is disconnected when the first housing is removed.

14. The apparatus according to claim 1, wherein at least one of the first and second housings and the fuel cell housing has centering or guide means for interlocking attachment.

15. The apparatus according to claim 1, wherein the first and second housings are attachable to the fuel cell housing by screws or by latching means.

16. The apparatus according to claim 1, wherein the first and second housings are rigidly attachable to the fuel cell housing.

17. The apparatus according to claim 1, wherein a dedicated housing for fuses in the branches is arranged in the first and second housings of the monitoring and switching unit.

18. The apparatus according to claim 17, wherein the fuses of the high-voltage line network are arranged in a fuse housing, and are accessible via a closeable opening, from outside the first housing.

19. The apparatus according to claim 17, wherein the fuses are arranged on a printed circuit board underneath a sealable cover of the first housing.

20. The apparatus according to claim 1, wherein the converter for a drive motor for the mobile device is protected by a fuse in the first housing.

21. The apparatus according to claim 1, wherein the first and second housings are composed of metal.

22. The apparatus according to claim 1, wherein the first and second housings are composed of plastic.

23. The apparatus according to claim 1, wherein the first housing comprises metal and plastic parts.

24. The apparatus according to claim 1, wherein the first housing has a switch or sensor on a housing opening, which opens the fuel cell circuit breaker.

25. The apparatus according to claim 1, wherein fuses for the circuits of the low-voltage line network are arranged in the first housing.

26. The apparatus according to claim 24, wherein fuses for the circuits of the low-voltage line network are arranged in fuse holders on a printed circuit board.

27. The apparatus according to claim 1, wherein components for precharging the DC/DC converter are arranged in a fourth housing on the first housing.

28. The apparatus according to claim 1, wherein a manually operable off switch is arranged in at least one of the first and second housings, upstream of the fuel cell circuit breaker in the conductors.

29. Apparatus for distributing electric power from a fuel cell to loads which are connected to a high voltage network that is connectable to the fuel cell, and to further loads in a low voltage network that is coupled to the high voltage network, said apparatus comprising:
a central monitoring and switching unit;
a control and evaluation unit associated with the central monitoring and switching unit;
a first housing that is detachably mountable on a fuel cell housing of the fuel cell, said central monitoring and switching unit being situated within said first housing; and
electrical conductors which enter into said first housing, are connected at outer ends thereof to respective electrical outputs of the fuel cell, and are coupled at inner ends thereof to said high voltage network; wherein
said conductors are connected to said loads via electrical contacts and branch lines which include fuses in at least one pole thereof, and which pass through a wall of said first housing via bushings;
the low voltage network is connected to said control and evaluation unit via electrical contacts and at least one bushing in a wall of said first housing;
the control and evaluation unit is connected to sensors for detecting operating states of the apparatus, via electrical contacts and bushings in a wall of the first housing;
the bushings are dust and water-tight; and
the electrical contacts are disconnectable.

* * * * *